(12) United States Patent
Burch et al.

(10) Patent No.: US 9,917,835 B2
(45) Date of Patent: *Mar. 13, 2018

(54) TECHNIQUES FOR SECURE MESSAGE OFFLOADING

(71) Applicant: Micro Focus Software Inc., Wilmington, DE (US)

(72) Inventors: Lloyd Leon Burch, Payson, UT (US); Volker Gunnar Scheuber-Heinz, Pleasant Grove, UT (US); Jon Hardman, Springville, UT (US)

(73) Assignee: Micro Focus Software Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,920

(22) Filed: Dec. 9, 2016

(65) Prior Publication Data
US 2017/0093859 A1 Mar. 30, 2017

Related U.S. Application Data

(63) Continuation of application No. 14/592,741, filed on Jan. 8, 2015, now Pat. No. 9,531,687, which is a (Continued)

(51) Int. Cl.
H04L 29/06 (2006.01)
H04L 9/14 (2006.01)
(Continued)

(52) U.S. Cl.
CPC ............ H04L 63/0884 (2013.01); H04L 9/14 (2013.01); H04L 51/046 (2013.01);
(Continued)

(58) Field of Classification Search
None
See application file for complete search history.

(56) References Cited

U.S. PATENT DOCUMENTS 6,760,752 B1 * 7/2004 Liu .................... H04L 63/0428
709/206
7,039,678 B1 5/2006 Halahmi et al.
(Continued)

OTHER PUBLICATIONS

U.S. Appl. No. 13/485,567, filed May 31, 2012, Techniques for Secure Message Offloading, now U.S. Pat. No. 8,938,613.
(Continued)

Primary Examiner — Eric Chen
(74) Attorney, Agent, or Firm — Schwegman Lundberg & Woessner, P.A.

(57) ABSTRACT

Techniques for secure message offloading are presented. An intermediary is transparently situated between a user's local messaging client and an external and remote messaging client. The user authenticates to the local client for access and the intermediary authenticates the user for access to the remote client using different credentials unknown to the user. Messages sent from the local client are transparently encrypted by the intermediary before being passed to the remote client and messages received from the remote client are transparently decrypted before being delivered to the local client.

8 Claims, 7 Drawing Sheets

Related U.S. Application Data continuation of application No. 13/485,567, filed on May 31, 2012, now Pat. No. 8,938,613.

(51) Int. Cl.
*H04L 29/08* (2006.01)
*H04L 12/58* (2006.01)
*H04L 9/32* (2006.01)
*G06F 7/04* (2006.01)
*G06F 15/16* (2006.01)
*G06F 17/30* (2006.01)

(52) U.S. Cl.
CPC ...... *H04L 63/0471* (2013.01); *H04L 63/0815* (2013.01); *H04L 67/10* (2013.01)

(56) References Cited

U.S. PATENT DOCUMENTS

| | | | |
|---|---|---|---|
| 7,457,955 B2 | 11/2008 | Seshadri et al. | |
| 7,921,292 B1* | 4/2011 | Pauker | H04L 9/083 713/171 |
| 7,996,673 B2* | 8/2011 | Ivanov | G06Q 20/383 340/5.8 |
| 8,024,411 B2 | 9/2011 | Pulfer et al. | |
| 8,032,750 B2 | 10/2011 | Swedor et al. | |
| 8,079,066 B1* | 12/2011 | Cordell | G06F 21/41 713/150 |
| 8,085,936 B2 | 12/2011 | Peel et al. | |
| 8,316,237 B1* | 11/2012 | Felsher | H04L 9/0825 380/282 |
| 8,667,267 B1* | 3/2014 | Garcia | H04L 63/061 380/202 |
| 8,837,739 B1* | 9/2014 | Sexton | H04L 63/0464 380/278 |
| 8,938,613 B2 | 1/2015 | Burch et al. | |
| 9,531,687 B2 | 12/2016 | Burch et al. | |
| 2002/0004902 A1* | 1/2002 | Toh | H04L 63/0442 713/170 |
| 2002/0087862 A1* | 7/2002 | Jain | H04L 9/3247 713/176 |
| 2002/0101998 A1* | 8/2002 | Wong | H04L 9/0894 380/286 |
| 2003/0204720 A1* | 10/2003 | Schoen | H04L 51/04 713/153 |
| 2004/0073795 A1 | 4/2004 | Jablon et al. | |
| 2007/0067395 A1 | 3/2007 | Blinn et al. | |
| 2007/0245414 A1 | 10/2007 | Chan et al. | |
| 2009/0119504 A1 | 5/2009 | Van Os et al. | |
| 2009/0222908 A1 | 9/2009 | Warren | |
| 2010/0054261 A1* | 3/2010 | Somech | H04L 43/00 370/400 |
| 2011/0047371 A1* | 2/2011 | Timby | G06F 21/33 713/153 |
| 2011/0047606 A1 | 2/2011 | Blomquist et al. | |
| 2011/0154459 A1* | 6/2011 | Kuang | H04L 63/08 726/6 |
| 2012/0017078 A1* | 1/2012 | Reno | H04L 9/06 713/153 |
| 2012/0042216 A1* | 2/2012 | Blubaugh | H04L 63/029 714/48 |
| 2012/0246463 A1* | 9/2012 | Shea | H04L 63/061 713/153 |
| 2012/0252405 A1* | 10/2012 | Lortz | G06F 8/60 455/410 |
| 2013/0080769 A1* | 3/2013 | Cha | H04L 63/168 713/155 |
| 2013/0191650 A1* | 7/2013 | Balakrishnan | G06F 21/6227 713/190 |
| 2013/0326218 A1 | 12/2013 | Burch et al. | |
| 2015/0121064 A1 | 4/2015 | Burch et al. | |

OTHER PUBLICATIONS

U.S. Appl. No. 14/592,741, filed Jan. 8, 2015, Techniques for Secure Message Offloading, now U.S. Pat. No. 9,531,687.
U.S. Appl. No. 13/485,567, Non Final Office Action dated Jan. 21, 2014, 9 pgs.
U.S. Appl. No. 13/485,567, Response filed Apr. 21, 2014 to Non Final Office Action dated Jan. 21, 2014.
U.S. Appl. No. 13/485,567, Final Office Action dated May 15, 2014, 9 pgs.
U.S. Appl. No. 13/485,567, Response filed Jul. 15, 2014 to Final Office Action dated May 15, 2014, 8 pgs.
U.S. Appl. No. 13/485,567, Advisory Action dated Jul. 25, 2014, 3 pgs.
U.S. Appl. No. 13/485,567, Notice of Allowance dated Sep. 15, 2014, 14 pgs.
U.S. Appl. No. 14/592,741, Preliminary Amendment filed Jan. 1, 2015, 7 pgs.
U.S. Appl. No. 14/592,741, Non Final Office Action dated Apr. 15, 2016, 17 pgs.
U.S. Appl. No. 14/592,741, Response filed Jul. 13, 2016 to Non Final Office Action dated Apr. 15, 2016.
U.S. Appl. No. 14/592,741, Notice of Allowance dated Aug. 24, 2016, 14 pgs.
"LuxSci FYI", [Online]. Retrieved from the Internet: <URL: http://luxsci.com/blog/email-outsourcing.html>, (Mar. 9, 2012 (accessed)), 2 pgs.
"Message transfer agent", [Online]. Retrieved from the Internet: <URL: http://en.wikipedia.org/wiki/Message_transfer_agent>, (Mar. 8, 2012 (accessed)), 4 pgs.
"PDF Postman User Manual", [Online]. Retrieved from the Internet: <URL: http://www.encryptomatic.com/pdfpostman/doc/index.html>, (Mar. 8, 2012 (accessed)), 8 pgs.

* cited by examiner

TECHNIQUES FOR SECURE MESSAGE OFFLOADING

This application is a continuation of U.S. patent application Ser. No. 14/592,741, filed Jan. 8, 2015, which is a continuation of U.S. patent application Ser. No. 13/485,567, filed May 31, 2012, now issued as U.S. Pat. No. 8,938,613, each of which is incorporated herein by reference in its entirety.

BACKGROUND

Cloud computing is rapidly changing the Internet into a collection of clouds, which provide a variety of computing resources, storage resources, and, in the future, a variety of resources that are currently unimagined.

As the industry moves email workloads to the cloud, which were once housed locally within the enterprise, the security of the enterprise is being compromised, because private information moves outside the control of the company. One of the main concerns when moving to Software as a Service (SaaS) application within the cloud is "data leakage." Furthermore, the complexity of management increases along with the ability to secure the privacy of email.

The security problem is created because an in-house administrator no longer has control of email messages that are stored in the cloud. Control is delegated to a cloud vendor, who may have many customers and may even mix customers email data within a single store. Such a situation limits the controls that a company administrator can have of the company email messages. So, it is no longer possible to control which employees are to be trusted with confidential data in the companies email messages. The location of the email data stores may not even be known by the company administrator; notwithstanding what other companies are using the same store for their email or what level of security is used to safe guard the data. The situation makes it very difficult to prevent "data leakage" from the corporate/enterprise email system.

This problem has already occurred with the U.S. government Google email accounts, which were hacked and which had large data leakage. Secretary of State, Hilary Clinton, has already had to make public statements admitting that there had been data lost from the email cloud used by government workers. These problems impair cloud acceptance and those companies that use cloud-based services. Cost will continue to drive companies to the cloud, but companies need keep the same level of security and control that they had when the data was controlled on their premises; particularly for sensitive data, such as emails.

SUMMARY

Various embodiments of the invention provide techniques for secure email offloading. Specifically, and in one embodiment a method for secure message offloading is presented.

In an embodiment, a login by a user is detected from a local messaging client to a local messaging server. The user is separately logged into a cloud-based messaging service using credentials for the cloud-based message service that are different from other credentials used by the user to achieve the login with the local messaging server and the credentials are unknown to the user. Securely processing messages sent from and delivered to the user on the local messaging client by transparently acting as an intermediary between the local messaging service and the cloud-based messaging service.

DETAILED DESCRIPTION

Figure 1:
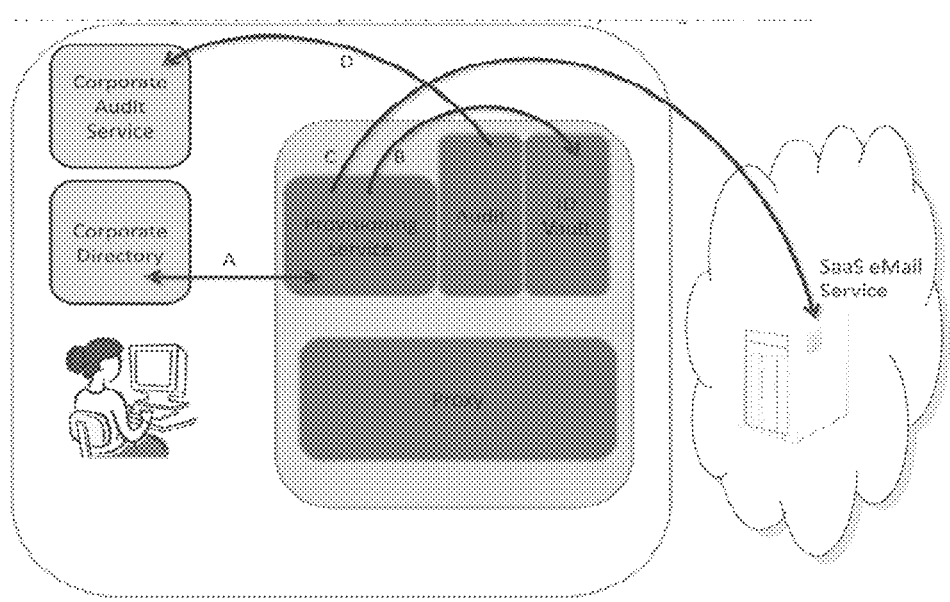
FIG. 1 is a diagram depicting a technique for initially provisioning a new user with credentials for a SaaS email service, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a cloud, a portion of a cloud, a set of coordinating services, a hardware device, an agent, an application, or various combinations of these things. The "workload" can also include a variety of other resources. For example, a workload for identity management may include a variety of secure database, a variety of authentication services, and a variety of network machines.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, email or messaging products, cloud-computing-based products, and other products distributed by Novell®, Inc., Attachmate® Corporation, and/or NetIQ® Corporation.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-7.

FIG. 1 is a diagram depicting a technique for initially provisioning a new user with credentials for a SaaS email service, according to the techniques presented herein. It is noted that the FIG. 1 is presented for purposes of illustration and comprehension. It is to be understood that other arrangements and/or components can be used to achieve the teachings presented herein and below. It is also noted that FIG. 1 is presented from the perspective of a SaaS email service but other cloud-based messaging services may also be used without departing from the teachings provided herein; therefore, the embodiments provided are not just limited to email-based implementations.

The components of the FIG. 1 are implemented in non-transitory and processor-readable storage medium and are executed on physical processors on one or more networks. Each processor specifically configured to execute the components.

As will be demonstrated more completely herein and below, the techniques presented make message offloading secure and seamless for enterprises.

In an embodiment, this is achieved by creating an intelligent workload email "agent" or "appliance," such as via a transparent proxy device. The appliance is located on the customer's premises (local email server environment) and acts as a local email Simple Mail Transfer Protocol (SMTP), Post Office Protocol (POP), or Internet Message Access Protocol (IMAP) server end point for the customer's email clients. In fact, it should be noted that the embodiments are not tied to any particular communication protocol, such that any future developed communication protocol can use the teachings presented herein. The email clients use local authentication credentials to authenticate to the appliance without allowing the corporate credentials to leave the corporation boundaries. This allows the local email client authentication to use protocols such as Kerberos, name and password or other local credentials without sharing keys, secrets or corporate passwords with the SaaS email service (remote messaging service). The appliance also validates user input credentials locally. The appliance then uses generated SaaS credentials for the SaaS email service to act as an intermediary between the local email client and the SaaS email service.

In an embodiment, the appliance includes the ability to provision email accounts to the SaaS email service. Policy is used to determine which accounts should be provisioned to the SaaS email service. The appliance generates a credential for each SaaS email account and stores it in an Identity (ID) Vault of the appliance. The credential is set on the SaaS email account, by the appliance, is unknown to the end user but is known to the appliance.

So when a user uses his/her email client, the credential on the WINDOWS® or mobile based client uses the "name and password," or other cooperate tokens that the user normal logs in with. These credentials are sent to the appliance via standard email protocols. The appliance then validates the credentials from the user's email client. If the users "local client credentials" are correct, the appliance looks up, or creates, the "SaaS server credentials" for this user. The "SaaS server credentials" are then used to build a new email protocol request that is sent to the SaaS email service. The appliance becomes an email proxy service to the SaaS service from the user's client.

According to an embodiment, the appliance makes the connection with the SaaS email service as a proxy (such as transparent proxy) for the user and connects the user to the SaaS email service. This allows the appliance to have complete control of the type of security used. The appliance can control, by policy, Secure Sockets Layer (SSL) connections and Transport Layer Security (TLS) connections. It can also control, by policy, the connection to the SaaS email service connection. These are two separate connections and can be different levels of encryption and are set by policy. This allows an administrator to control what level of connection security is used inside the corporation and what can be used outside the corporation. The various techniques and data flows described above are used for POP, IMAP and SMTP protocols. Thus, this places the appliance in the data flow for all sent and received email traffic supported by the appliance. As a result, an enterprise can offload message services and avoid the classic "Data Leakage" problem currently faced by institutions that outsource their email services.

In another aspect of the invention presented herein, "Data Leakage" of the content of the email messages is prevented. In an embodiment, this is achieved by the appliance using the information it has about a message and a user to make policy decisions on how to encrypt and store the message on a cloud-based email service, via standard email protocols. The encryption used by the appliance reformats the email message, from the user's client, into a standard's based Secure Multi-purpose Internet Mail Exchange (S-MIME) message, and sends it to the email service. This allows any email service (or messaging service) to handle the message without any modifications. The S-MIME encoding of the messages can be achieved with a different key for each user, or may use single keys for many users. Because the message is stored on the SaaS email service as an encrypted S-MIME message, and the decryption key is only stored on the appliance at the corporation (local processing environment of the corporations email/message server), the message is secure. In this way "data leakage" is prevented. If the SaaS service is compromised, the contents of the message cannot be discovered without the secret S-MIME key held at the corporation. Having access to the data on the SaaS email server does not give access to the content of the email messages.

Policies of the appliance can be configured to select when and how the email messages are encrypted. An example of a policy includes, "if all recipients of the email message are employees, then S-MIME encrypt with a common key." It is noted that this is only an example and is not meant to limit the scope of the techniques presented herein. Other policy statements such as " . . . encrypt with users key," "create multiple messages encrypted with different keys," "lookup recipient and encrypt with his/her public key," and many other forms of policy are easily achieved as well.

So, when a user retrieves his/her messages with his/her client application, using POP3 or IMAP (or others), the request is sent to the appliance. The appliance validates the user's local credentials and if valid forwards the request to the SaaS email service with the SaaS credentials for the user. The SaaS email service then returns the S-Mime encrypted messages to the appliance, were the appliance detects the S-Mime encryption of the message. Policy then determines if the user has rights to the message, if so the S-Mime message is decrypted with the keys kept by the appliance. The decrypted message is then sent to the client email application as a standard MIME message and is displayed to the user.

This prevents "Data Leakage" of confidential messages that are stored on SaaS email service in the cloud. Therefore, the unencrypted message and keys to read that message never leave the company's control.

According to an embodiment, since the only way to read messages that use various techniques presented herein are via the decryption, access to the messages can be audited in a way that can guarantee that there is an audit event created each time the message is read (decrypted). Such a situation allows non-repudiation of the generated audit event, which can be used to prove that a message has been read.

In summary, some novel features of the techniques presented herein include:

1) preventing the use of corporate (or any credentials) passwords on a SaaS email server (or any cloud-based messaging service);

2) encrypting out bound messages from a corporation by converting them from Mime (or any insecure format) to S-Mime (or any secure format) as they are sent to the SaaS service;

3) decrypting S-Mime messages from the SaaS service as they are sent to the local message client of a user;

4) setting SaaS email accounts credentials by an intermediary (the appliance) transparent to the user;

5) generating a non-reputation audit event for each message read from the SaaS system;

It is to be noted that each of the novel features discussed above and below occur without changes or knowledge of the local messaging client or the SaaS service (remote cloud-based messaging service).

With this context, the techniques are now discussed within the context of the FIGS. 1-4 for an example implementation that securely offloads or outsources email processing from a local email system to a SaaS email system. It is to be again noted that the techniques can be used with any messaging-based systems and are not strictly tied to email-based implementations.

Referring now to the FIG. 1 and its processing.

At "A," a new user is enabled by policy to use the email system. The appliance (local email server proxy) captures the event that allows the new access to proceed.

At B, a user name and password pair are randomly generated for the user and stored in the ID Vault. Again, the user is completely unaware of the content of the user name and password pair and lacks the ability to discover it.

At C, the appliance provisions the user with the generated password to a SaaS mail service.

At D (an in an embodiment), the audit system generates an event and sends it to a corporate auditing system.

Figure 2:
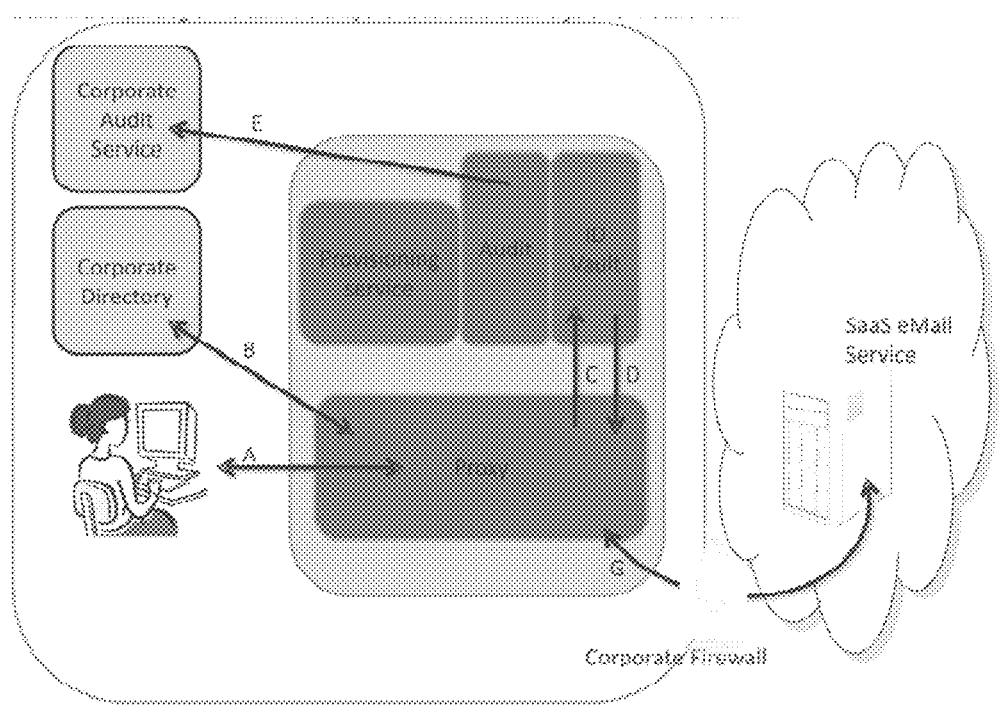
FIG. 2 is a diagram depicting a technique for transparently signing the user of the FIG. 1 into the SaaS email service via a local email system, according to techniques presented herein.

FIG. 2 is a diagram depicting a technique for transparently signing the user of the FIG. 1 into the SaaS email service via a local email system, according to techniques presented herein. Again, it is noted that the technique presented in the FIG. 2 can be used with other message-based services and does not have to be exclusively tied to SaaS email services. Moreover, the components of the FIG. 2 are implemented in non-transitory computer-readable storage medium that are executed on processing devices.

At "A," the user uses his/her email client running on WINDOWS® (as one example) to access the corporate email system using his/her credentials such as Kerberos, name and password pair, or any other required corporate login information. The user, via the client, connects to the corporate email server in a normal manner and is unaware of the appliance and its processing that follows. Again, this connection to the corporate email server from the email client can be SSL, TLS or no encryption at all based on policy.

At B, the appliance validates the corporate credentials at the corporate directory. This could be any form of credentials such as the name and password used to login the client workstation, Kerberos, NT Local Area Network (LAN) Manager (NTLM), or whatever the client email software supports.

At C, the now-authenticated user is mapped to the ID Vault and a request for credentials for the SaaS email service is made (this was generated and described above with reference to the FIG. 1).

At D, the credentials for the SaaS Mail service are returned to a Proxy (a component of the appliance—it is noted the whole appliance may be viewed as a proxy).

At E (and in an embodiment), the audit component reports the authentication to the corporate audit system.

At G, the appliance proxies the client request (A) to the SaaS email Service, via a firewall (G), with the credential from the ID Vault (D) to create an authenticated connection for the user to the SaaS email service. This connection may be SSL, TLS or use no encryption—the connection type is based on a configured policy for the corporation and/or for the user. The SaaS email service replies (G) with a response to the proxy that is sent to the client (A).

It is noted that the processing of "A," E, and G may be repeated for each client command given.

Figure 3:
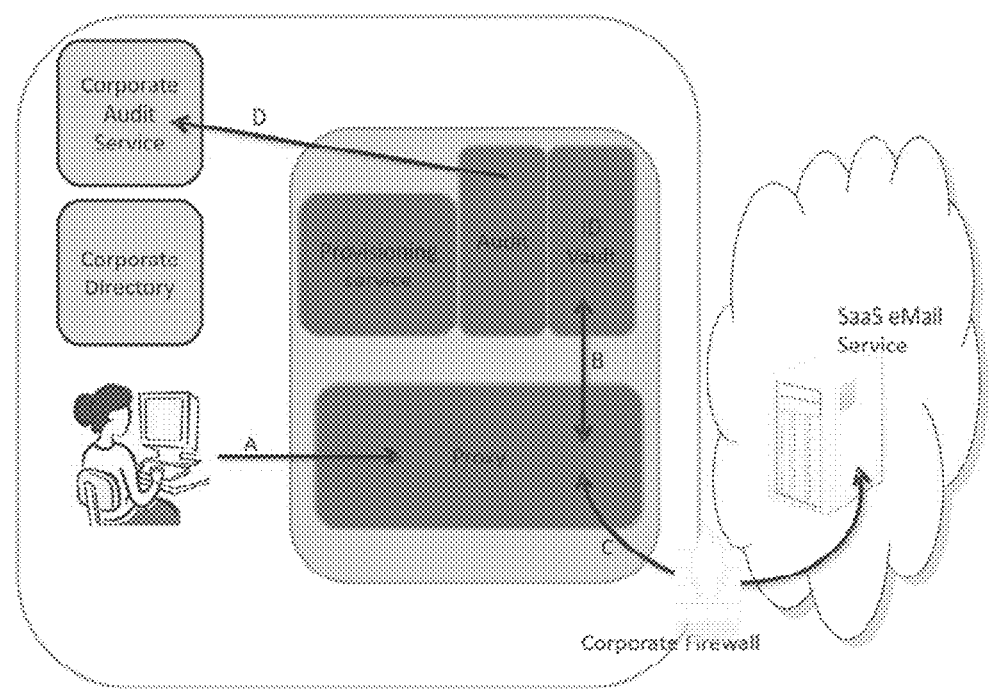
FIG. 3 is a diagram depicting a technique for transparently encrypting messages sent from the local email system of the FIG. 2 to the SaaS email service, according to techniques presented herein.

FIG. 3 is a diagram depicting a technique for transparently encrypting messages sent from the local email system of the FIG. 2 to the SaaS email service, according to techniques presented herein. The technique is not exclusively tied to SaaS email services and can be used with any cloud-based messaging services. The components of FIG. 3 are implemented in non-transitory computer-readable storage media, which execute on a processing device.

At "A," the client sends a message via SMTP to the proxy. This is a standard's base Mime message. The proxy intercepts and redirects the message to the cloud-based messaging service. The client and/or user of the local email service need not be aware of the redirection that takes place via the proxy.

At B, the appliance receives the message and if policy requires (encryption is being used) retrieves the encryption key from the ID Vault.

At C, the appliance uses the encryption key to build a new S-Mime message and the appliance sends the new S-Mime message to the SaaS email Service.

At D (and in an embodiment), an audit event is sent to the corporate audit service.

Figure 4:
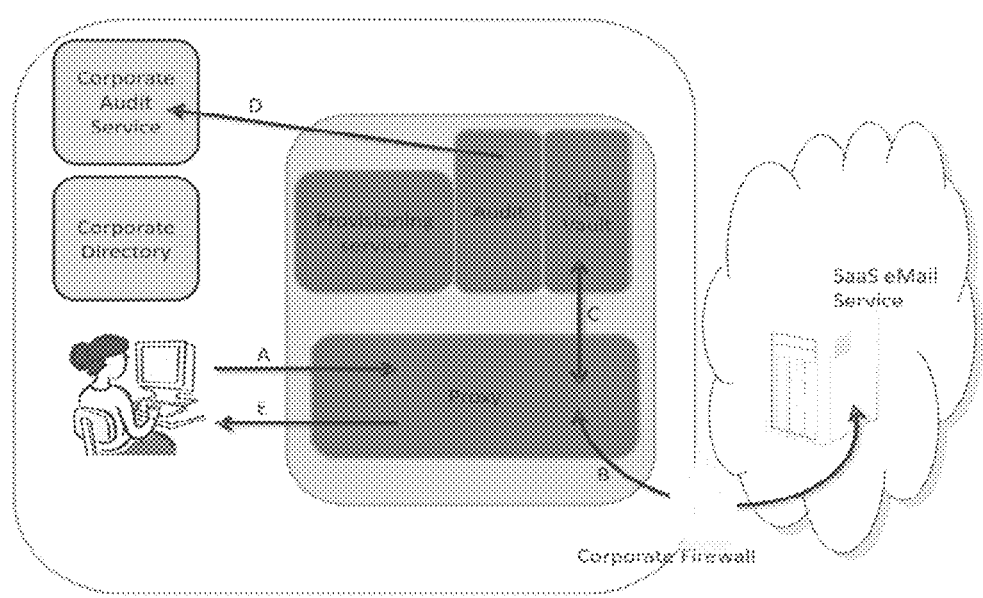
FIG. 4 is a diagram depicting a technique for transparently decrypting messages received from the SaaS email service of the FIG. 3 in the local email system, according to techniques presented herein.

FIG. 4 is a diagram depicting a technique for transparently decrypting messages received from the SaaS email service of the FIG. 3 in the local email system, according to techniques presented herein. Again, the technique is not exclusively tied to SaaS email services and can be used with any cloud-based message service. Furthermore, the components of the FIG. 4 are implemented in non-transitory computer-readable storage media that execute on one or more processing devices.

At "A," the client sends an IMAP or POP "GET MESSAGE" request to what the client believes is the local email server but the proxy acquires the request for processing.

At B, the appliance forwards or proxies the request to the SaaS email service and the requested message is returned.

At C, if the message is in S-Mime encrypted, the invention gets the corresponding key(s) from the ID Vault if policy allows. The keys are used to decrypt the S-Mime message and build a Mime message.

At D (and in an embodiment), an audit event is sent to the corporate audit service.

At E, the Mime message is sent to the client machine for access by the user in a normal manner via the local email client software.

The FIGS. 1-4 describe how initial setup and processing can be transparently achieved for securely offloading or outsourcing email processing, via an appliance (proxy). The discussion was presented from the perspective of email but it is noted can be used for any message-based service being securely outsourced to the cloud. The presented techniques provide for a variety of novel features some of which were discussed above, such features include but are not limited to:

1) Using a proxy to transform authentication to a third-party messaging service without changing the native messaging service or the third-party service and without knowledge or the user associated with the local messaging service.
   A) Using a name and password (N/P) from one domain to authenticate to another domain (local messaging service to the remote (cloud-based) messaging service).
   B) Transforming one form authentication to another such as N/P, Kerberos, or NTLM to N/P (local message service can use different authentication technique from that which is needed by the remote messaging service).
   C) Hiding the "Server Credentials" from the end user (user is unaware of and lacks access to the remote messaging service credentials).
   D) Hiding the "Client Credentials" form the remote messaging service (remote messaging service is unaware of and lacks access to the local messaging service credentials).
2) Using a messaging service proxy to build a compliance audit trail.
   A) Audit authentication.
   B) Audit read messages.
   C) Audit sent messages.
   D) Provide non-reputation for message access.
3) Using a messaging service proxy to provide access control to messaging services; this can be custom policy based.
4) Integrating a proxy service, an ID Vault and a provisioning service to provide Single Sign-On (SSO) to multiple messaging services (local messaging service and remote messaging service).
   A) Providing password (any credential) generation and other credential algorithmic creation and storage.
   B) Automated account creation with known/unknown secrets or credentials.
   C) Automatically updated passwords at a SaaS service, without user interaction.
5) Using a proxy to provide and guarantee that all data traffic sent outside of the corporation's firewall is protected by SSL or TLS security.
   A) Data sent between the techniques presented herein and the client can be via a clear (no encryption) connection or via a SSL (encryption based) connection.
   B) Data sent to the mail service from the techniques presented herein can be protected by SSL and cannot be set by the end user but is set by a company administrator.

Figure 5:
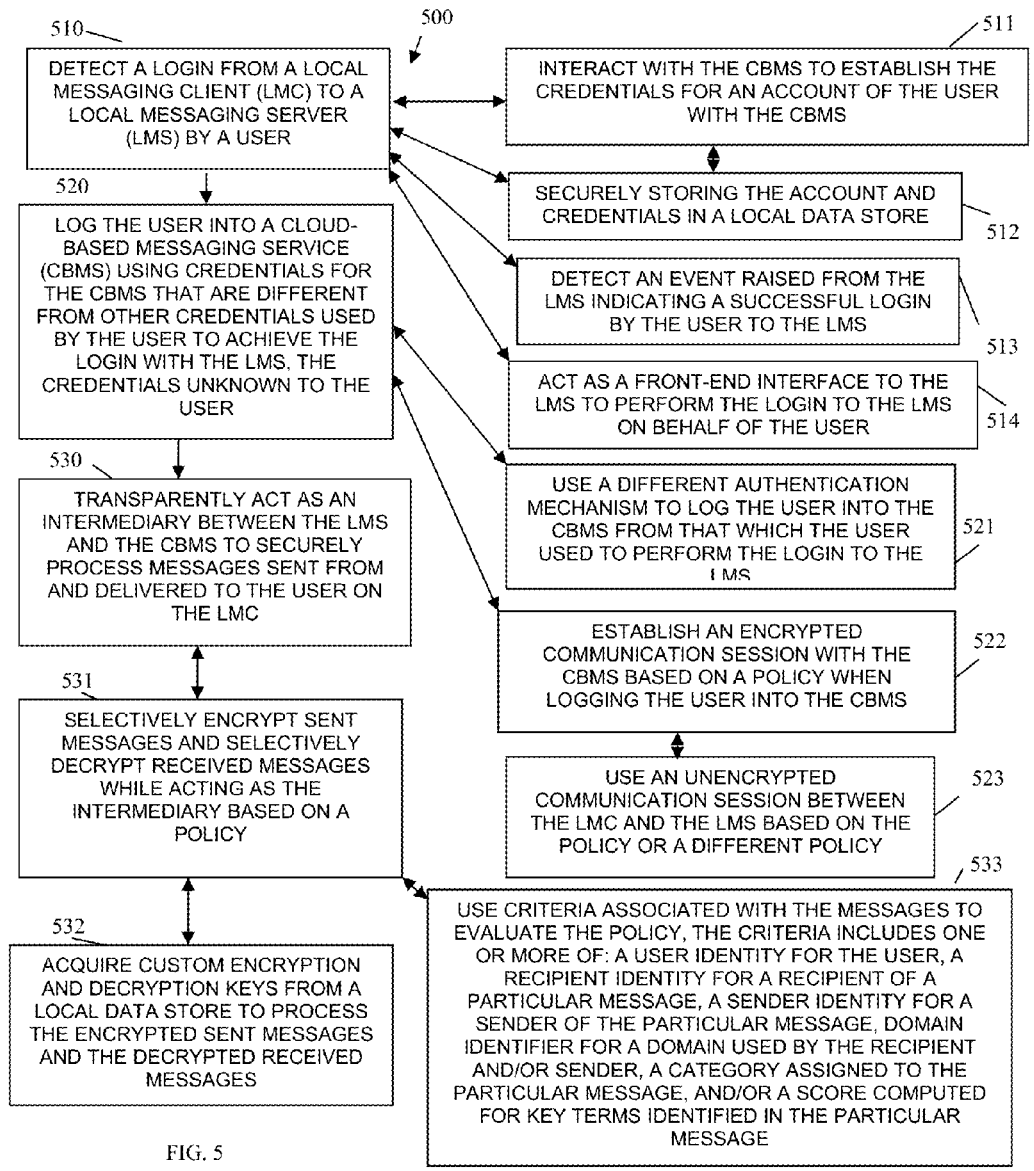
FIG. 5 is a diagram of a method for secure message offloading, according to embodiments presented herein.
Figure 6:
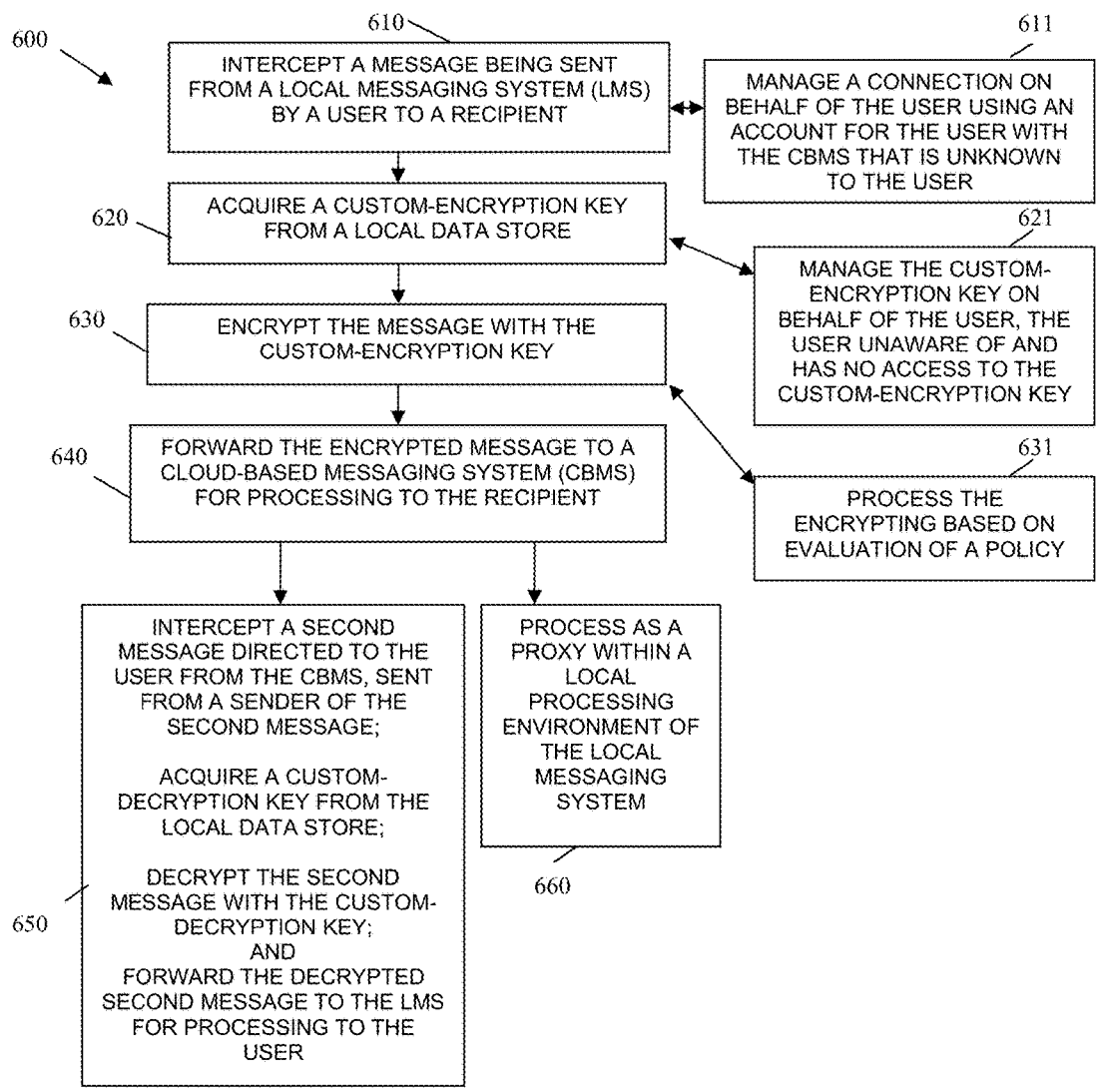
FIG. 6 is a diagram of another method for secure message offloading, according to embodiments presented herein.
Figure 7:
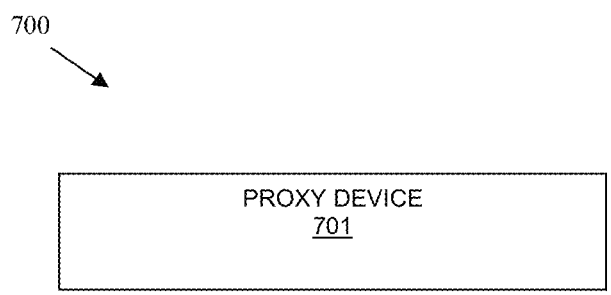
FIG. 7 is a diagram of a secure message offloading system, according to embodiments presented herein.

Now various other embodiments and additional descriptions and enhancements to the techniques presented above are discussed within the context of the processing associated with the FIGS. 5-7.

FIG. 5 is a diagram of a method 500 for secure message offloading, according to embodiments presented herein. The method 500 (herein referred to as "message-outsource manager") is implemented, programmed, and resides within a non-transitory machine-readable storage medium that executes on one or more processors of a network. The network may be wired, wireless, or a combination of wired and wireless.

At 510, the message-outsource manager detects a login from a local messaging client to a local messaging server. The login is processed by a user. In an embodiment, a user uses his/her email client (one type of a local messaging client) to login to his/her corresponding email server (one type of a local messaging server). The user is completely unaware of the presence of the message-outsource manager as is the local messaging client. The detection of the login by the user can occur before the successful login occurs or after a successful login occurs in a variety of manners, some of which were discussed above with reference to the FIGS. 1-4 and some of which are discussed below.

According to an embodiment, at 511, the message-outsource manager interacts with the cloud-based messaging service to establish the credentials (discussed below with reference to the processing at 520) for an account of the user with the cloud-based message service.

Continuing with the embodiment of 511 and at 512, the message-outsource manager securely stores the account and credentials in a local data store, which is local to the local messaging server within a local processing environment of the server.

In a scenario, at 513, the message-outsource manager detects an event raised from the local messaging server indicating a successful login by the user to the local messaging server. In other words, the message-outsource manager can listen for specified events on specified ports to detect when the successful login occurred or can be interjected as a proxy to detect the event indicating a successful login.

In a different situation, at 514, the message-outsource manager acts as a front-end interface to the local messaging server to perform the login to the local messaging server on behalf of the user. This can be a proxy situation where the local messaging client believes that it is contacting the local messaging server and is redirected to the message-outsource manager where the message-outsource manager passes through the login credentials for authenticating to the local messaging server. Even in this scenario, it is to be noted that no changes need to necessarily occur with the local messaging client or the local messaging server, such that the presence of the message-outsource manager can remain undetected with respect to these entities and such that no changes are needed with these entities for the message-outsource manager to integrate its processing.

At 520, the message-outsource manager logs the user into a cloud-based messaging service using credentials for the cloud-based messaging service. The credentials used by the message-outsource manager to authenticate the user to the cloud-based messaging service are different from other credentials used by the user to login to the local messaging server (used in the processing at 510). The credentials used by the message-outsource manager are unknown to and not accessible to the user.

According to an embodiment, at 521, the message-outsource manager uses a completely different authentication mechanism to log the user into the cloud-based messaging service from that which the user used to perform the login to the local messaging server.

In another case, at 522, the message-outsource manager establishes an encrypted communication session with the cloud-based messaging service based on a policy when logging the user into the cloud-based messaging service. So, SSL or TLS or any other type of encrypted communication protocol can be used to create a secure communication session with the cloud-based messaging service.

Continuing with the embodiment of 522 and at 523, the message-outsource manager uses an unencrypted or insecure communication session between the local messaging client and the local messaging server based on the same policy of 522 or a different policy being used from 522. This can occur when both the local messaging client and the local messaging server exists within the confines of a secure environment, such as a LAN firewalled environment.

So, the connections between the local client and local server can be secure or insecure and similarly the connections between the message-outsource manager and the cloud-based messaging service can be secure or insecure. In fact, any combination of connection types can be used based on configured policies.

At 530, the message-outsource manager transparently acts as an intermediary between the local messaging server and the cloud-based messaging server to securely process messages sent from and delivered to the user on the local messaging client. So, each message sent from and delivered to the user via the local messaging client is inspected by the message-outsource manager. In some situations, the select messages may be simply passed through the message-outsource manager to the local messaging server or the cloud-based messaging service with no action. In other cases, based on policy the messages are encrypted and decrypted as discussed below.

In an embodiment, at 531, the message-outsource manager selectively encrypts sent messages and selectively decrypts received messages while acting as the intermediary based on policy evaluation.

Continuing with the embodiment of 531 and at 532, the message-outsource manager acquires custom encryption and decryption keys from a local data store to process the encrypted sent messages and the decrypted received messages.

Still continuing with the embodiment of 531 and at 533, the message-outsource manager used dynamically evaluated criteria associated with the messages to evaluate conditions defined in the policy. The criteria can include a variety of information, such as: a user identity for the user, a recipient identity for a recipient of a particular message, a sender identity for a sender of the particular message, a domain identifier for a domain used by the recipient and/or sender, a category assigned to the particular message, and/or a score computed for key terms identified in the particular message.

FIG. 6 is a diagram of another method 600 for secure message offloading, according to embodiments presented herein. The method 600 (herein after referred to as "message offload manager") is implemented, programmed, and resides within a non-transitory machine-readable storage medium that executes on one or more processors of a network. The network may be wired, wireless, or a combination of wired and wireless.

The message offload manager presents another and in some instances an enhanced perspective of the message outsource manager represented by the method 5200 of the FIG. 5 (discussed above).

At 610, the message offload manager intercepts a message being sent from a local messaging system by a user to a recipient.

According to an embodiment, at 611, the message offload manager manages a connection on behalf of the user using an account for the user with a cloud-based messaging system that is unknown to the user and inaccessible to the user.

At 620, the message offload manager acquires a custom-encryption key from a local data store. That is, the message offload manager, the local data store, and the local messaging system all process within the same local environment with one another. The local data store is managed and accessible to the message offload manager but not the user or the local messaging system.

In an embodiment, at 621, the message offload manager manages the custom-encryption key on behalf of the user and the user is unaware of and has no access to the custom-encryption key.

At 630, the message offload manager encrypts the message with the custom-encryption key.

According to an embodiment, at 631, the message offload manager processes the encryption based on evaluation of a policy.

At 640, the message offload manager forwards the encrypted message to a cloud-based messaging system for processing to the recipient. So, at no time does the cloud-based messaging system handle the message in decrypted format and the cloud-based messaging system has no access to the encryption or corresponding decryption keys, which are managed exclusively under the control of the message offload manager within the local processing environment.

In an embodiment, at 650, the message offload manager can also intercept a second message directed to the user from the cloud-based messaging system. This second message sent from a sender of the second message. It may also be that the second message is sent directly to the local email system bypassing the cloud-based messaging system and the message offload manager intercepts the second message before it can be processed by the local messaging system. Next, the message offload manager acquires a custom-decryption key from the local data store and decrypts the second message with the custom-decryption key on behalf of the user. Finally, the message offload manager forwards the decrypted second message to the local messaging system for processing to the user.

In another embodiment, the message offload manager is processed as a proxy, such as a transparent proxy, within the local processing environment of the local messaging system as discussed above.

FIG. 7 is a diagram of a secure message offloading system 700, according to embodiments presented herein. The components of the secure message offloading system 700 are implemented, programmed, and reside within a non-transitory machine-readable storage medium that executes on one or more processors of a network. The network may be wired, wireless, or a combination of wired and wireless.

In an embodiment, the secure message offloading system 700 implements, inter alia, the processing associated with the methods 500 and 600 of the FIGS. 5 and 6, respectively.

The secure message offloading system 700 includes a proxy device 701.

The proxy device 701 includes one or more processors with memory and/or storage and is programmed with executable instructions within a non-transitory computer-readable storage medium for execution on the one or more processors. Example processing associated with the proxy device and its executable instructions was discussed above with reference to the FIGS. 1-6.

The proxy device 701 is configured to transparently manage a cloud-based account for a user to a cloud-based messaging system. Moreover, the proxy device 701 evaluates policy to selectively and transparently encrypt and decrypt messages sent from and to a user, via a local messaging system. So, the proxy device 701 is used for securely and transparently outsourcing or offloading message processing from the user's local messaging system to the cloud-based messaging system.

According to an embodiment, the proxy device 701 is situated within a local processing environment of the local messaging system.

Continuing with the previous embodiment, the local messaging system and the cloud-based messaging system are different and disparate email systems from one another.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
providing a secure and custom encryption and decryption of messages sent from and directed to a messaging client, wherein the messaging client is unaware of the custom encryption and decryption service, and the custom encryption and decryption service is processed transparently by a cloud-based intermediary service to the messaging client; and
transparently logging a user into access to the custom encryption and decryption service when the user logs into the messaging client, wherein transparently logging includes using different set of credentials from original credentials provided by the user when the user logs into the messaging client, where the different set of credentials are processed for logging the user into the custom encryption and decryption service.

2. The method of claim 1 further comprising establishing an encrypted communication session between the processing of the method and the message client.

3. The method of claim 1, wherein providing further includes intercepting those messages being sent from the messaging client and intercepting those messaged being directed to the messaging client in a manner that is transparent to the messaging client.

4. The method of claim 1, wherein intercepting further includes performing the encryption and decryption of the messages at a Secure Socket Layer (SSL) and Transport Layer Security (TLS) level for network protocols processing the transport of the messages.

5. The method of claim 1, wherein providing further includes obtaining an encryption and decryption key that is unique to a user of the messaging client for encrypting and decrypting the messages.

6. The method of claim 5, wherein providing further includes transparently performing the encryption and decryption in a manner that the user is unaware of.

7. The method of claim 1, wherein encrypting further includes obtaining a custom-encryption key to process the encryption and decryption of the messages, the custom-encryption key unique to a user of the message client.

8. The method of claim 1 further comprising, reformatting those messages that are decrypted and directed to the messaging client as Secure Multi-purpose Main Exchange (S-MIME) messages.

* * * * *